United States Patent [19]

Barnett et al.

[11] Patent Number: 5,205,046
[45] Date of Patent: Apr. 27, 1993

[54] METHOD FOR MEASURING SURFACE WAVINESS

[75] Inventors: Andrew J. Barnett, Dearborn Heights; Hector J. Ramirez, Canton, both of Mich.

[73] Assignee: Ford Motor Company, Dearborn, Mich.

[21] Appl. No.: 711,488

[22] Filed: Jun. 5, 1991

[51] Int. Cl.⁵ .............................................. G01D 5/20
[52] U.S. Cl. ........................................ 33/533; 33/556
[58] Field of Search .............. 33/533, 600, 679.1, 33/566, 485, 486, 487, 489, 533, 554, 555, 551, 503; 73/159

[56] References Cited

U.S. PATENT DOCUMENTS

| | | | |
|---|---|---|---|
| 3,470,739 | 10/1969 | Takafuji et al. | |
| 3,762,053 | 10/1973 | Day | 33/533 |
| 3,911,586 | 10/1975 | Malouda | 33/533 |
| 4,120,093 | 10/1978 | Spies | 33/533 |
| 4,164,694 | 8/1979 | Amsbury et al. | 33/554 |
| 4,693,012 | 9/1987 | Cesna | 33/533 |
| 4,718,173 | 1/1988 | Eklund | 33/533 |
| 4,894,920 | 1/1990 | Butler et al. | 33/836 |
| 4,914,828 | 4/1990 | Fiedor et al. | 33/554 |

FOREIGN PATENT DOCUMENTS

| | | | |
|---|---|---|---|
| 0214919 | 10/1984 | Fed. Rep. of Germany | 33/533 |
| 0140817 | 6/1986 | Japan | 33/551 |
| 0185114 | 8/1987 | Japan | 33/533 |

Primary Examiner—William A. Cuchlinski, Jr.
Assistant Examiner—William C. Dowling
Attorney, Agent, or Firm—Daniel M. Stock; Clifford L. Sadler

[57] ABSTRACT

A method an apparatus for simply and inexpensively objectively measuring the waviness of a panel such as an automotive sheet metal panel utilizes a digital flushness gauge mounted on a fixture to slide in planar fashion over a surface. Depth readings are taken at regular increments along a scaled axis, and the absolute value of differences between succeeding readings is computed to yield an indication of the degree of waviness resulting from the total slope change over the length through which readings are taken.

3 Claims, 2 Drawing Sheets

METHOD FOR MEASURING SURFACE WAVINESS

BACKGROUND OF THE INVENTION

The present invention relates generally to the mechanical measurements of surfaces and, more specifically, to measurement of waviness in product surfaces, such as sheet metal and window glass.

In manufacturing external surface components of an automotive vehicle, controlling the quality of the surface finish is an important consideration. Without regard to the acceptability of the function of a component itself, a component that displays an external surface that is aesthetically unpleasing is often viewed by consumers as a product lacking in quality. Two criteria for judging the aesthetic acceptability of a sheet metal panel relate to the absence of roughness and waviness in the panel. Roughness may be defined for convenience here as microscopic changes in the slope of the surface. "Orange peel" conditions in the painted surface are one example of an unacceptable rough surface on a sheet metal panel. A depression or "streamer" formed in a sheet metal panel during a drawing operation during the stamping of the panel, on the other hand, results in larger macroscopic changes in the slope of the surface defined by that operation. This is waviness. Any surface variation that becomes visible to a consumer when the surface waves are sufficient to cause discontinuities in the reflection of light is an unacceptable level of waviness.

While techniques for measuring roughness are relatively well-developed, the measurement of waviness remains a largely subjective practice dependent at least in part on the visual perception of a wide variety of inspectors. Certain direct measurement techniques are available, however. Among them, the use of expensive profilometers to provide a magnified plot on scaled paper of the profile of a surface. The device is used in conjunction with a reference of the intended design curve of the part itself. Computer aided design data or blueprint information must be compared to the readings of the profilometer and charted for deviations. This is a slow and time-consuming process that cannot effectively be used with great frequency in a high volume production environment such as is encountered in the automotive industry. The recording of a sufficient number of profile data points to define the part's shape for comparison with the intended design also require subjective evaluation of the comparison, tending to dilute its effectiveness. The method utilizing profilometer measurements for evaluating sheet metal panel waviness suffers from the additional defect that it inherently measures absolute values from some fixed base line that is calibrated to the shape of the intended design. Each individual deviation from that base line shape definition must be individually analyzed to determine what effect the deviations have on the aesthetic perception of waviness.

The prior art teaches the use of another mechanism for determining waviness that suffers from the last mentioned defect in that it works about a fixed reference in U.S. Pat. No. 3,470,739 to Takafuji et al.

SUMMARY OF THE INVENTION

Responsive to the deficiencies in the prior art, it is an object of the present invention to provide a method and apparatus for measuring surface waviness in a panel that functions without the use of a calibrated base line.

It is another object of the invention to provide such a method and apparatus which is readily adaptable to high volume production.

It is still another object of the present invention to provide such a method and apparatus that is objective in result not requiring subjective interpretation of esthetic values with respect to the surface.

It is yet another object of the present invention to provide an apparatus which is economically producible and readily adaptable to use in large scale manufacturing facilities.

According to the invention, a digital flushness gauge is mounted on a fixture axially movable along the surface to be measured, the gauge being operated to take sample readings at incremental distances during that movement. The sequential readings are compared and differences between adjacent readings are utilized to yield the local waviness difference. The absolute values of these local differences are summed to create a "waviness index" number.

According to another feature of the present invention, a fixture is provided for holding the digital flushness gauge which defines a plane for positioning the gauge with respect to the measured panel, thereby minimizing the variations in measurement attendant the change in operators of the equipment.

BRIEF DESCRIPTION OF THE DRAWINGS

These and other objects and features will be apparent to those skilled in the measurement arts upon reading the following description with reference to the accompanying drawings, in which.

DESCRIPTION OF THE PREFERRED EMBODIMENT

Figure 1:
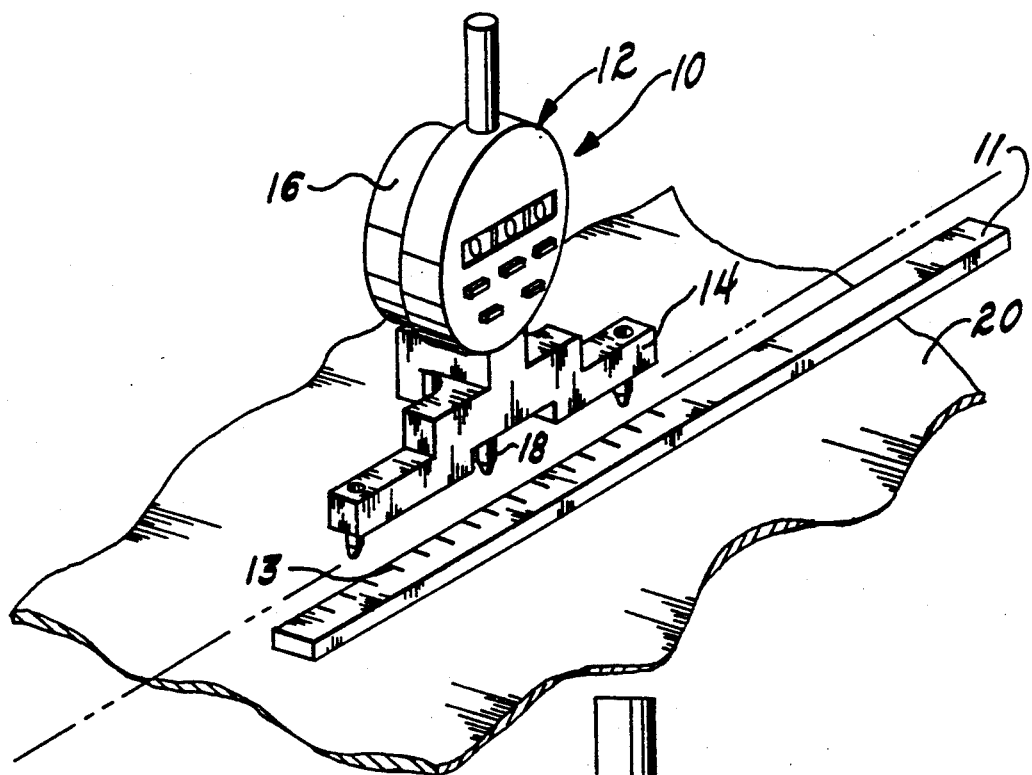
FIG. 1 is a perspective view of an apparatus according to the present invention in use for measurement of a panel.

The waviness measurement apparatus 10 of the present invention is illustrated as comprising a digital flushness gauge 12 and a fixture 14. The digital flushness gauge 12 is illustrated as comprising a readout module 16 operatively connected to a probe 18 engageable and vertically displaceable in contact with a surface 20 to be measured, as may best be seen in FIGS. 1 and 2.

The flushness gauge 12 can utilize any of a number of depth measuring devices. One example of a device that can be used as the digital flushness gauge 12 is that manufactured by Mitutoyo Corporation as its Model 543-182. With that particular gauge, the probe 18 includes a mounting portion 22 which shoulders against an upper surface 24 of the fixture 14. The operative measurement portion 26 of the probe 18 depends below the fixture 14 and is vertically movable, as may best be seen in FIG. 2. As the measurement portion 26 moves vertically in response to changes in the surface 20, the digital flushness gauge 12 is operative to display suitable numerical indicia on the screen indicated at 28.

The fixture 14 is preferably formed as a unitary structure fabricated by precision machining to define three feet 30, 32, 34 spanning a raised central portion 36 from which the measuring portion 26 of the digital flushness gauge 12 depends. Mounting pins 38, 40, 42 depend from the feet 30, 32, 34, respectively, are smooth and coplanar, thereby defining a plane for orientation of the axial movement of the measurement portion 26 of the digital flushness gauge 12.

According to one preferred embodiment of the Present invention, the fixture 14 is fabricated from tool steel and is 110 mm long from the end of the foot 30 to the end of the foot 32 and is 29.5-mm wide from the distal end of the foot 34 to the opposed edges of the feet 30, 32.

Figure 2:
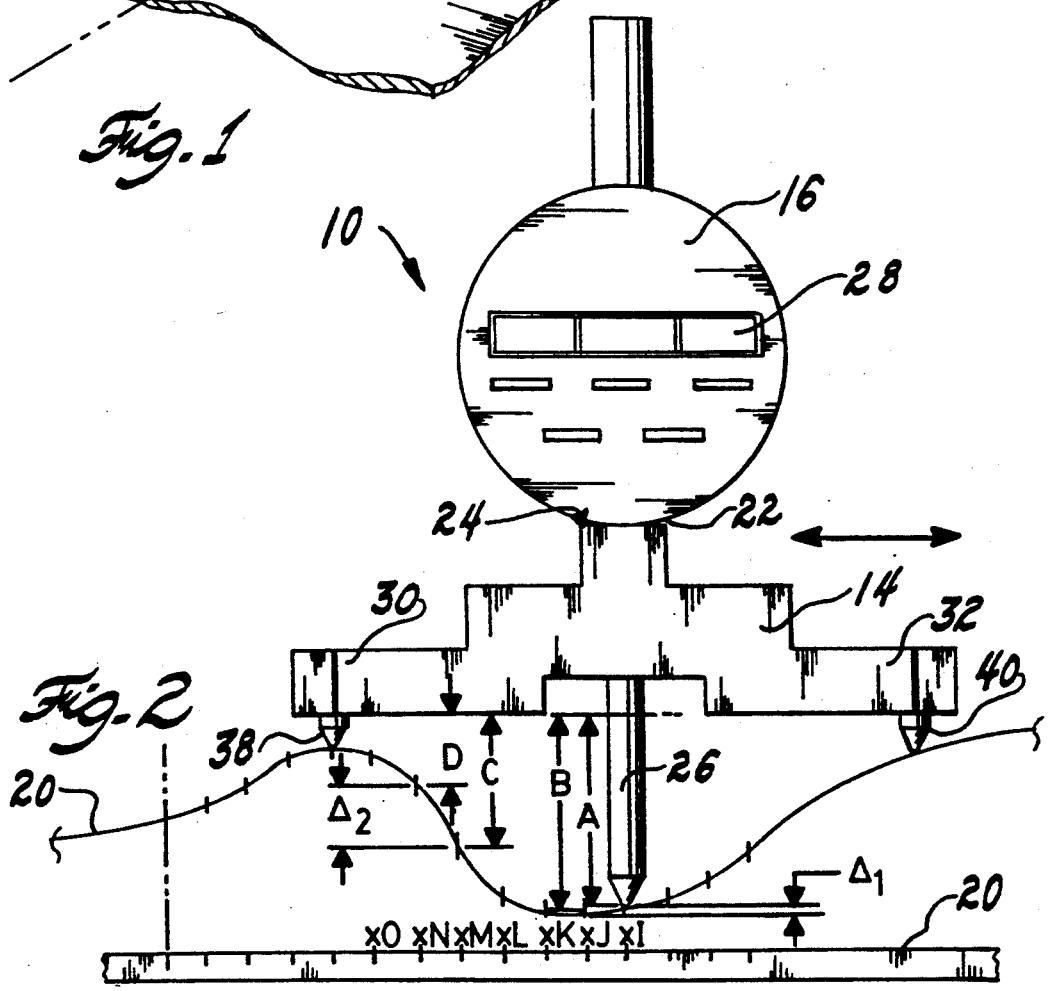
FIG. 2 is a diagrammatic view of the apparatus of the present invention illustrating its measurement of a surface.
Figure 4:
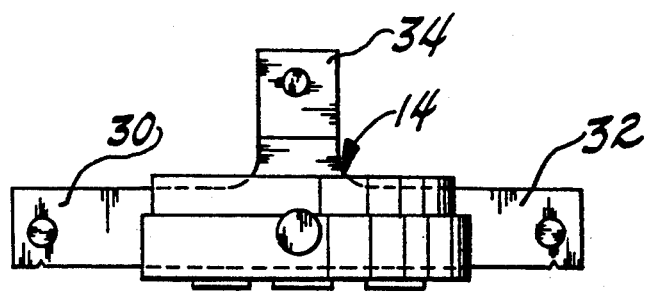
FIG. 4 is a top view of the apparatus.

As can be seen in FIG. 2, it is intended, according to the present invention that the apparatus 10 further includes a measurement template 11, which need be of no particular configuration, merely providing a linear scale marked as indicated at 131, along which the apparatus 10 is moved. It may, however, be smooth edged and fixed to the surface 20 for guiding movement of the fixture 14.

Figure 3:
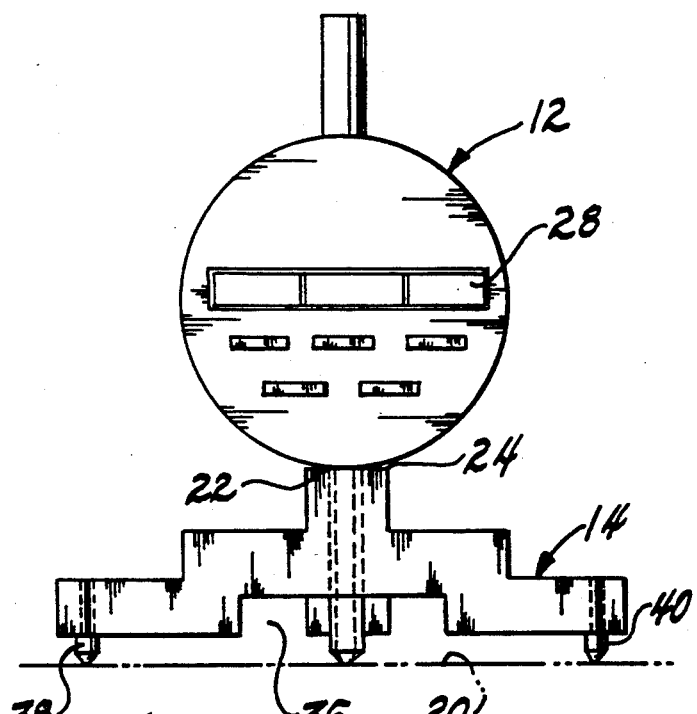
FIG. 3 is a front view of the apparatus of the present invention.
Figure 5:
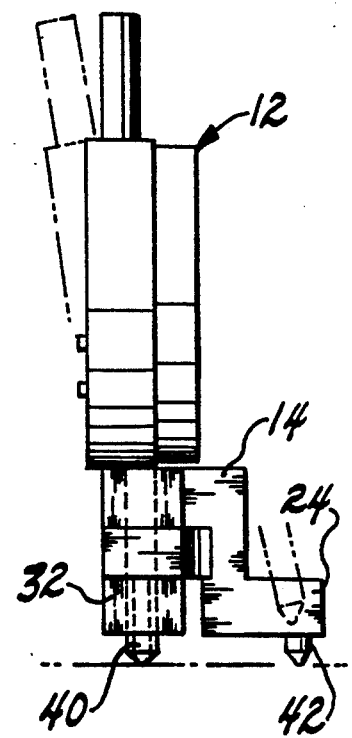
FIG. 5 is a side view of the apparatus.

The method of using the apparatus 10, according to the present invention, can be well appreciated by reference to FIG. 2. The apparatus 10 is placed in confronting relationship with the surface 20 of a sheet metal panel oriented as shown in FIG. 1. The feet 30, 32, 34 engage the panel through pins 38, 40, 42, and the probe 18 is vertically displaced to yield a reading on the screen 28 indicative of the position of the probe 18 with respect to the plane defined by the feet 30, 32, 34. Fixture 14 is then moved along the panel along the axis of the template 11 at regular increments indicated by the indicia XI, XJ, XR . . . , and readings are displayed on the screen 28 for each of these positions, each representing a position of the probe with respect to the plane defined by the fixture 14 when moved to the position corresponding to the increment on the measurement template 11. Since the incremental changes along the axis parallel to the measurement template are fixed, the changes between each consecutive reading by the probe 18 are indicative of the slope between these two points. Consistency in readings is enhanced by the three-point definition of the fixture plane. It will be appreciated, however, that the tips of the mounting pins may be configured to accommodate some third leg tipping, as is illustrated in exaggerated fashion in FIG. 3. The waviness of a particular panel can be evaluated by sequentially subtracting each prior reading from each subsequent reading and recording the difference throughout a desired length of the template, such as 150 mm at 10 mm increments. Summing the absolute value of these differences is then effected to yield a "waviness index" number. The larger number of this summation is the greater the total sensed slope change and the wavier the surface. Utilizing this method with the simple apparatus described provides a repeatable, inspector-insensitive technique technique for determining the waviness of a panel.

While only one embodiment of the method and apparatus of the present invention are here described, others may be possible without departing from the scope of the appended claims. For example, a multiplicity of probes could be fixtured for effecting simultaneous collection of a number of readings; and automated gauge movement and data recording and computation techniques could be utilized.

We claim:

1. A method of determining the waviness of a panel comprising:
   providing a fixture defining a flat planar surface;
   mounting a depth measuring gauge on the fixture;
   moving the fixture and the mounted gauge into confronting relationship with the panel at a first position;
   operating the gauge to measure the depth of the panel with respect to the planar surface;
   sliding the fixture along a predetermined axis to a plurality of subsequent positions spaced from each other and from the first position in a predetermined sequential relationship;
   repeating the operating and measuring step at each of the subsequent positions;
   computing the difference between each measurement and the measurement at the directly subsequent position to each measurement; and
   computing the absolute value of the differences as an indication of the waviness of the panel.

2. A method as defined in claim 1 and further comprising providing a template and arranging the template with respect to the panel to define the predetermined axis and the predetermined sequential sliding movement of the fixture.

3. A method as defined in claim 2 and further comprising fixedly securing the template with respect to the panel.

* * * * *